Nov. 26, 1929.   F. D. CARPENTER   1,736,900
STEERING WHEEL LOCK FOR AUTOMOBILES
Filed Jan. 7, 1928   2 Sheets-Sheet 2
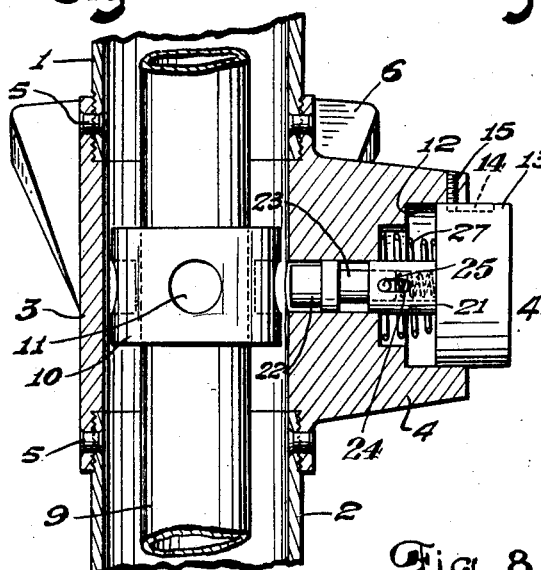
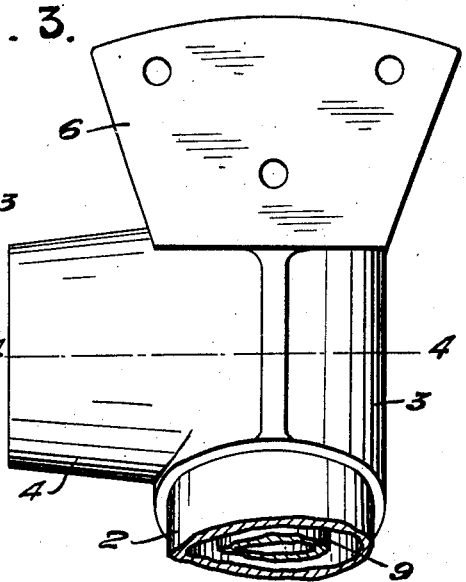
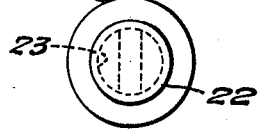
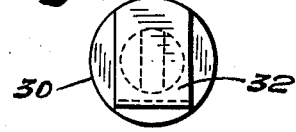
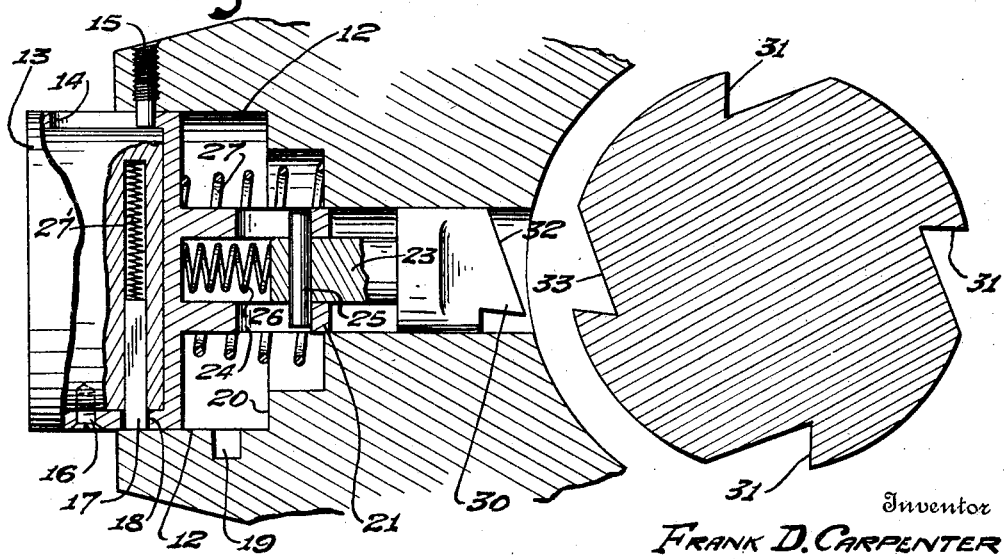
Inventor
FRANK D. CARPENTER
By
Attorney Patented Nov. 26, 1929

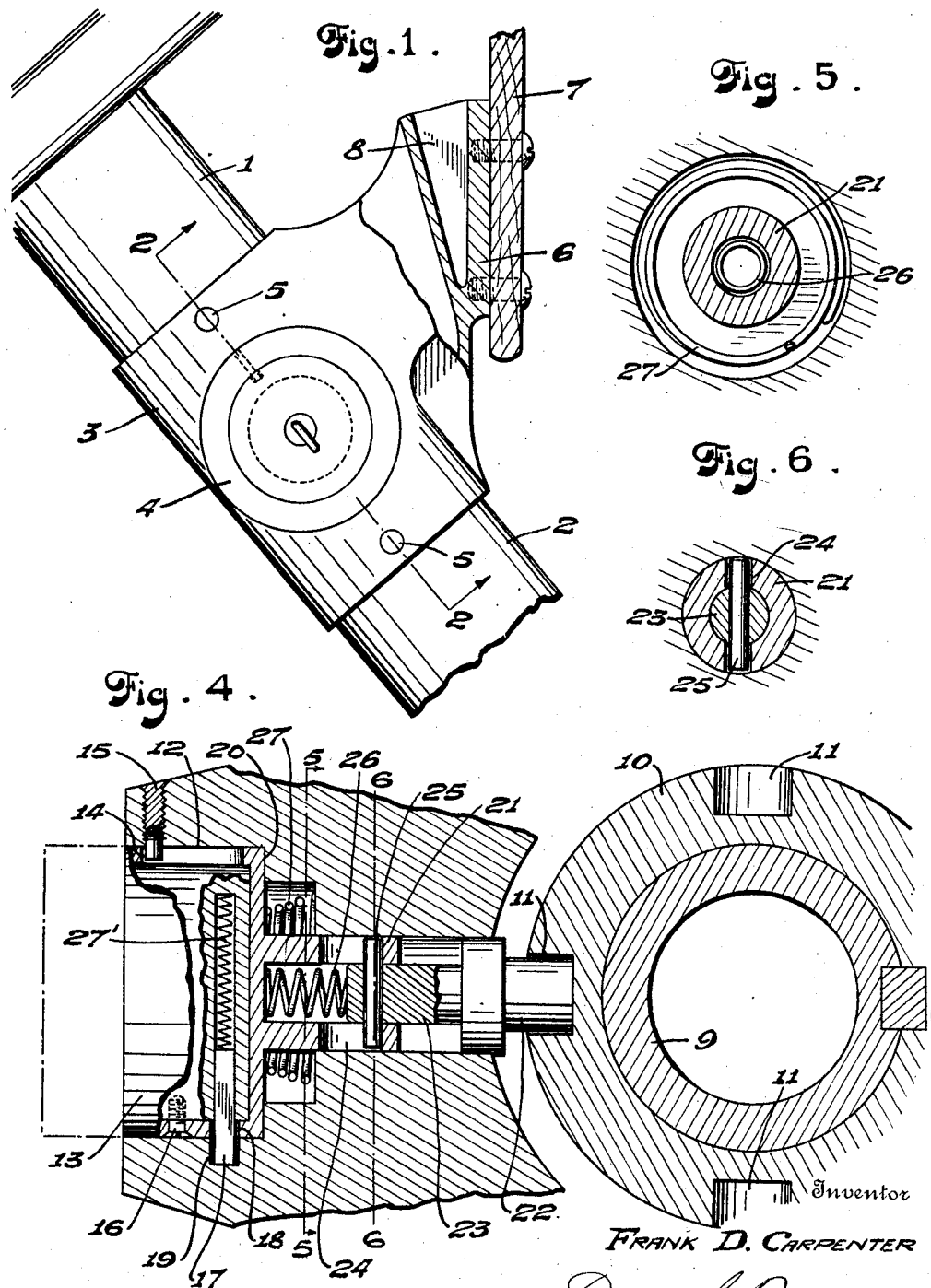

1,736,900

UNITED STATES PATENT OFFICE

FRANK D. CARPENTER, OF CONCORD, NEW HAMPSHIRE, ASSIGNOR OF ONE-HALF TO ARTHUR H. HOUGH, OF LEBANON, NEW HAMPSHIRE

STEERING-WHEEL LOCK FOR AUTOMOBILES

Application filed January 7, 1928. Serial No. 245,218.

This invention relates to steering wheel locks for automobiles and has for its object the provision of means associated with the fixed steering column, and engageable with the dirigible steering post to prevent rotation of said post. In one of the embodiments of the invention a construction is proposed which, when in locking position, inhibits altogether the rotation of the steering post, and in another embodiment of the invention the steering post is locked against movement in only one direction but is free to be turned in the opposite direction. This embodiment has the advantage that the operator can so lock his car that the wheels may be freely pointed outwardly from the curb, presupposing any emergency such as the necessity of moving the car to make room for the fire department, the wheels being automatically locked against any reversal from the assumed angularity, so that it becomes impracticable to tow the car away while supported by its own wheels.

Other objects of the invention will appear as the following description of the two illustrated embodiments thereof proceed.

In the drawings, in which the same characters of reference are used to designate similar parts, wherever shown, Fig. 1 is a side elevation, partly in section, showing my invention applied to the dash or cowlboard of an auto vehicle;

Fig. 2 is a longitudinal section through the device taken along the line 2—2 of Fig. 1;

Fig. 3 is a rear elevation, parts being broken away;

Fig. 4 is a cross section on an enlarged scale through the steering post lock and the steering post itself taken on the line 4—4 of Fig. 3;

Fig. 5 is a section taken along the line 5—5 of Fig. 4, and Fig. 6 is a section taken along the line 6—6 of Fig. 4;

Fig. 7 is a cross section through the lock and steering post of a slightly modified form of the invention; and Figs. 8 and 9 are views in end elevation of oppositions ends of the locking dog shown in Fig. 7.

Referring now in detail to the several figures, and first adverting to that form of the invention shown in Figs. 1 to 6 inclusive the numerals 1 and 2 represent respectively upper and lower sections of the fixed steering column of an automotive vehicle which has been severed to permit the interposition of the device of the present invention. The latter comprises a tubular member 3 to the opposite ends of which the ends of the severed steering column are connected, and being itself provided at one side with a boss or protuberance 4 constituting a housing for the locking mechanism. The opposite ends of the tubular member 3 are preferably formed as internally threaded nipples, the ends of the steering column to which they are secured being correspondingly threaded, and rivets 5 being passed through the walls of said nipples and steering column parts uniting said parts and tubular member in a rigid and inseparable manner. The tubular member 3 is also formed with a bracket 6 adapted to be bolted or otherwise suitably secured to the dash or cowl-board 7, of the vehicle and serve as a support for the steering column. Said bracket may, if desired, be formed with a pocket 8 for the reception of small articles, although this pocket is by no means an essential feature of the locking mechanism.

In that embodiment of the invention shown in Figs. 2 and 4 the part of the steering post which lies within the tubular member 3 is provided with recesses 11 for receiving the locking dog. In the preferred embodiment as shown, in order not to weaken the steering post by cutting into the same to form the recesses, a collar 10 is suitably fixed to the steering post 9, in which collar the recesses 11 are formed. The walls of these recesses are precipitous, for in this form of the invention it is intended that the locking dog shall be retained in these recesses regardless of the direction in which it may be attempted to rotate the steering post.

A bore extends through the boss or protuberance 4 radially of the tubular member. This bore is counterbored to form two recesses, of which the outer recess constitutes a chamber 12 for the reception of the lock-barrel 13. Said lock-barrel is provided on its periphery with a longitudinal groove 14 to receive the end of a screw pin 15 extending radially through the wall of the boss or protuberance 4 into the chamber 12. This screw pin 15 prevents rotation but permits longitudinal movement of the lock barrel and, by the abutment of its end against the end walls of said groove, limits longitudinal movement of the lock barrel in both directions. The lock itself may be of any suitable construction, it being necessary only that it be of the type which latches automatically, requiring a key only for the purpose of unlocking it. In the drawings, the lock is represented by the cylindrical body 13 fixed within the lock-barrel by means of a screw 16 provided with a radially movable bolt 17 projecting through a hole 18 in the lock-barrel and urged by a spring 27' against the wall of the chamber 12 when the lock-barrel is in its outward or unlocked position. When the lock-barrel is manually depressed to its innermost or locked position against the shoulder 20 formed at the inner end of the chamber 12 the end of the bolt 17 will enter a well 19 formed in the wall of the chamber 12 and thus hold the lock-barrel in depressed position.

The inner end of the lock-barrel is provided with a tubular extension 21 which is slidable in the smaller portion of the bore of the protuberance 4. A locking dog 22 is slidable in the inner end of the part of the bore of smallest diameter and has a stem 23 which extends into the tubular extension 21 of the lock-barrel. The tubular extension 21 has a pair of diametrically arranged longitudinal slots 24, and the opposite ends of a pin 25 extending diametrically of the stem 23 are movable longitudinally of said slots, thus permitting a limited reciprocatory movement between the lock-barrel and the locking dog.

A spring 26 in the tubular extension 21 between the lock-barrel and the stem 23 constantly biases the locking dog 22 in a locking direction. A second spring 27 occupies that part of the bore in the boss or protuberance which is of intermediate diameter and biases the lock-barrel, and with it the locking dog, in an outward or unlocking direction. Since the groove 14 in the lock barrel 13 is longer than the slot 24 in the tubular extension 21, the ends of the pin 25 will be engaged by the inner ends of the slots 24 before the end of the screw 15 will engage the inner end of the groove 14 when the lock-barrel is moved by the spring 27, so that the spring 27 will normally hold the locking dog in unlocked position.

In the operation of the device, the lock-barrel with the lock normally projects from the outer end of the protuberance or boss 4 in the manner indicated in dotted lines in Fig. 4.

When it is desired to lock the steering post, the lock-barrel and lock are depressed together, after the manner of a push-button, against the resistance of the spring 27 and when the lock and lock-barrel reach the point where the lock-barrel abuts against the shoulder 20 and can recede no further, the bolt 17 and well 19 will be in alinement so that the bolt will enter the well under the urge of the spring 27', and the lock and lock-barrel may then not return to their original position until the bolt has been withdrawn by means of a key.

When the lock-barrel is thus depressed, the stem 23 is moved toward the steering post permitting the dog 22 to follow, under pressure of the spring 26, until it abuts against the steering post. If one of the recesses 11 happens to be in registry with the path of the dog, the latter enters the recess and the steering post is then and there locked against rotation. But if a recess 11 is not in alinement with the path of the dog the end of the dog will bear against the steering post, whereupon a slight turn of the steering-wheel will bring one of the recesses 11 into alinement with the dog 22 to receive the end of the latter.

In that form of the invention shown in Fig. 7 the locking mechanism is quite similar to that which has just been described, the sole difference in construction being in the shape of the locking dog and in the cooperating recesses in the steering post. The end of the locking dog is formed as a tooth having an abrupt shoulder 30 on one side and a gradual slope 32 on the other and the steering post has peripheral notches 31 shaped to receive the inner end of the locking dog. It is clear that in this form of the invention the steering post, when rotated in one direction can slip past the dog, pushing the dog back through the action of the cooperative inclined surfaces 32 and 33, but that the steering post is inhibited from rotating in the opposite direction due to the interengagement of the abrupt face 30 of the dog and the notch of the steering post. It is obvious that in installing the device upon an auto vehicle, the steering post may be provided with the notches facing in the reverse direction from that shown and that the locking mechanism may also be reversed so that rotation of the steering wheel may be effected in the opposite direction from that possible with the device as illustrated. This feature of the invention is very valuable because a car so equipped can be readily pushed away to meet an emergency, and at the same time remain incapacitated for straight-away steering.

It is obvious that other details of construction than those herein disclosed may be utilized in carrying out the invention and that the present illustrative embodiment is by way of example only, and not to be considered as limitative in defining the scope of the invention.

What I claim is:—

1. In a locking device for the steering post of an auto vehicle, a casing including a tubular portion adapted to be interposed between the severed ends of a steering column surrounding the steering post, and to fixedly receive the ends of said severed parts, said steering post being provided, in a zone of said tubular portion, with recesses having inclined faces in one direction and abrupt faces in the other direction, said casing being provided with a lock housing having a bore therethrough in the zone of said recesses, and a lock in said housing having a member extensible through said bore into engagement with said recesses, said lock member being so shaped as to inhibit rotation of said steering post in one direction when engaged with the abrupt faces of the latter and to ride past said inclined faces and permit rotation of the steering column in the other direction.

2. A lock for steering posts comprising a fixed casing, a steering post extending through said casing, and locking mechanism within said casing including a push button having an extension directed toward said steering post, a spring normally biasing said push button outwardly from said casing, a locking dog having a lost motion connection with said extension, means limiting the outward movement of said push button, a locking latch carried by said push button and engaging said casing when said push button is fully depressed for holding said push button in depressed position, said steering post having means engageable by said dog, for locking it against movement, and yieldable means between said push button and dog, said yieldable means being operative, when said push button is depressed, to move said dog into position to lock said steering post against rotation.

3. A lock for steering posts comprising a fixed casing, and locking mechanism within said casing including a lock-barrel functioning as a push button, a spring in said casing normally biasing said lock-barrel outwardly of said casing, a pin and groove connection, between said casing and lock-barrel for determining the range of movement of said lock barrel, said lock barrel having an extension, a locking dog telescopically associated with said extension, a pin and slot connection between said locking dog and extension for limiting relative movement therebetween, a spring between said locking dog and extension for normally biasing said dog away from said lock barrel toward said steering post, a locking latch carried by said lock barrel to engage said casing when said lock barrel is fully depressed and hold the lock barrel in depressed position, said steering post having means engageable by said dog when said lock barrel is depressed for locking said steering post against rotation, the range of movement of the pin and groove connection between said lock barrel and casing being greater than the range of movement of the pin and slot connection between said dog and extension, to cause the complete release of said dog from said steering column when said lock barrel is moved outwardly of said casing.

4. A lock for steering posts comprising a fixed casing having a bore of three diameters forming chambers of which the outermost is the largest, and the innermost the smallest, a steering post extending through said casing, locking mechanism within said casing including a lock-barrel within said outer chamber functioning as a push button, a spring in the intermediate chamber normally biasing said lock barrel away from said post, a pin and groove connection between said casing and lock barrel for determining the range of movement of said lock barrel, said lock barrel, having an extension directed toward said steering post, a locking dog slidable in the inner chamber of the casing in telescopic relation to said extension, a pin and slot connection between said locking dog and extension for limiting relative movement therebetween, a spring between said locking dog and extension, and a locking latch carried by said lock barrel and engaging said casing when said lock barrel is fully depressed for holding the lock barrel in depressed position, said steering post having means engageable by said dog for locking the steering post against rotation when said lock barrel is in the depressed position, the range of movement of the lock barrel in the casing permitted by the connection therebetween being greater than the range of movement between said dog and extension permitted by the connection therebetween to cause disengagement of said dog from said steering post when said lock barrel is moved outwardly of said casing.

In testimony whereof I have hereunto set my hand.

FRANK D. CARPENTER.